United States Patent [19]
Cryer

[11] 3,780,241
[45] Dec. 18, 1973

[54] SELF CANCELLING DIRECTION INDICATOR SWITCHES

[75] Inventor: Edward Cryer, Higham, Nr. Burnley, England

[73] Assignee: Joseph Lucas (Industries) Limited, Birmingham, England

[22] Filed: Apr. 24, 1972

[21] Appl. No.: 246,584

[30] Foreign Application Priority Data
Apr. 29, 1971 Great Britain.................. 12,248/71

[52] U.S. Cl.......... 200/61.27, 200/61.3, 200/61.35, 200/61.54
[51] Int. Cl. ............................................. H01h 3/16
[58] Field of Search ............ 200/61.27–61.35, 61.54

[56] References Cited
UNITED STATES PATENTS

| | | | |
|---|---|---|---|
| 2,757,250 | 7/1956 | Brown et al. | 200/61.34 |
| 2,643,308 | 6/1953 | Lincoln et al. | 200/61.35 X |
| 2,800,541 | 7/1957 | Brown et al. | 200/61.34 |
| 2,800,542 | 7/1957 | Barcus et al. | 200/61.34 |
| 3,300,601 | 1/1967 | Du Rocher et al. | 200/61.34 |
| 3,431,373 | 3/1969 | Fuqua | 200/61.34 |

*Primary Examiner*—J. R. Scott
*Attorney*—John C. Holman et al.

[57] ABSTRACT

A self-cancelling direction indicator switch for a road vehicle comprising a body for attachment to a vehicle. An operating member is movable with respect to the body to complete the indicator lamp circuits in respective positions of the operating member relative to the body, and there is provided cancelling means for returning the operating member to a neutral position. The cancelling means is carried by the body and includes first and second annular members secured together, and defining an external groove by means of which the annular members are held captive on an inwardly projecting portion of the body. The first annular member includes an inwardly directed key for engagement in a slot in the steering shaft, and a projection on the first annular member effects return of the operating member to its neutral position when the steering shaft is rotated relative to the body.

2 Claims, 3 Drawing Figures

SELF CANCELLING DIRECTION INDICATOR SWITCHES

This invention relates to self-cancelling direction indicator switches for road vehicles.

According to the invention a direction indicator switch comprises a body for attachment to a vehicle, an operating number movable with respect to the body for completing in use circuits to the indicator lamps, and cancelling means for returning the operating member to a neutral position, the cancelling means being carried by the body and including a first annular member having at least one inwardly directed finger for engagement in a slot in the steering shaft of the vehicle, a projection on the first annular member for effecting return of the operating member to its neutral position on turning of the steering shaft relative to the body and a second annular member secured to the first annular member, said first and second annular members defining an external groove by means of which the annular members are held captive on an inwardly projecting portion of the body.

An example of the invention is shown in the accompanying drawings in which.

Figure 1:
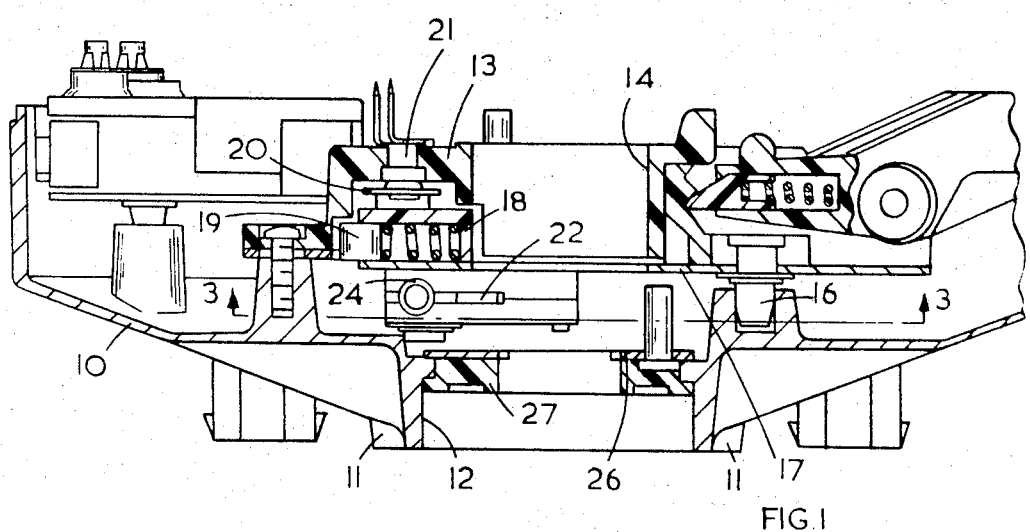
FIG. 1 is a section through the switch.
Figure 2:
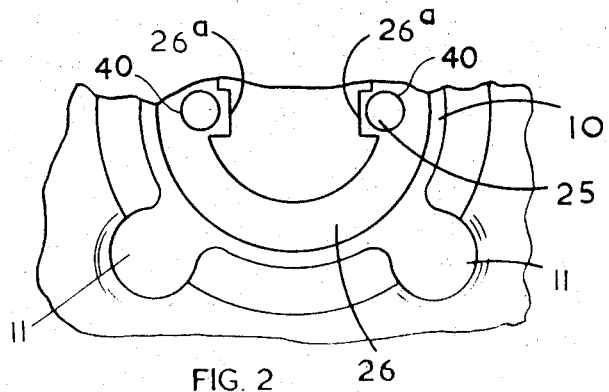
FIG. 2 is a fragmentary view showing a portion of the cancelling means of the switch.
Figure 3:
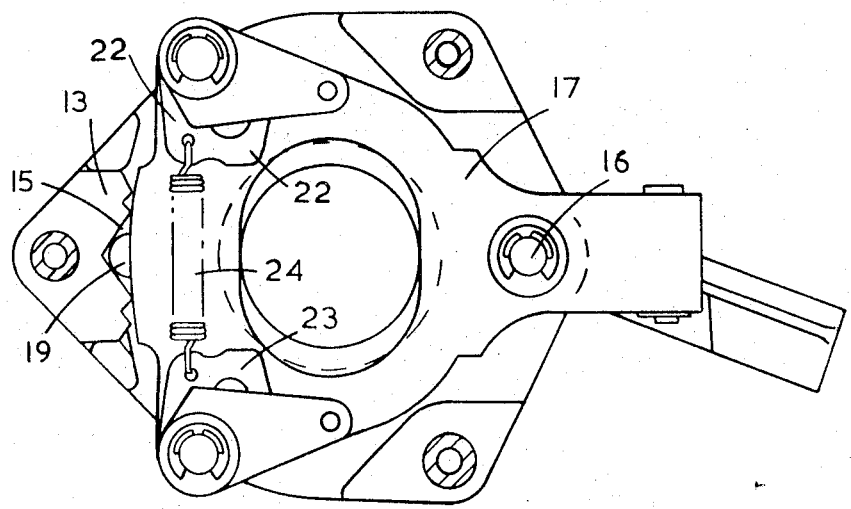
FIG. 3 is a fragmentary view taken on line 3—3 in FIG. 1.

The switch includes a body 10 with lugs 11 whereby it can be mounted on a support surrounding the steering shaft of a vehicle. The body has a passage 12 through which the steering shaft extends. A fixed contact carrier 13 which also has a passage 14, aligned with the passage 12, is secured to the body 10. As may be seen from FIG. 3 this carrier 13 has a cam face 15 comprising a central V-shaped notch and a pair of smaller V-shaped notches on opposite sides of the central notch respectively.

Pivotally mounted on the body 10 by means of a pivot pin 16, diametrically opposite the central notch of the cam face, is an operating member 17 on which there is mounted a movable contact carrier 18. A roller 19 is slidable in a passageway defined between the carrier 18 and the member 17 and is spring loaded into engagement with the cam face 15. The roller 19 and the cam face 15 co-act to locate the member 17 in three alternative positions, namely a neutral position in which the plunger engages in the central notch and two actuated positions in which the plunger 19 engages in the two smaller notches. It will be appreciated that only a small displacement of the operating member from its actuated positions is required to engage the plunger with one flank of the central notch so that the member 17 is returned to its neutral position.

The two contact carriers have contacts 20, 21 thereon such that one circuit is completed when the member 17 is in one actuated position and another is completed when it is in its other actuated position in known manner.

For providing the self-cancelling feature of the switch, a pair of pawls 22, 23 are pivotally mounted on the member 17 and are urged towards one another by a tension spring 24. The pawl 22 is movable in a clockwise direction about a pivot axis, but cannot be moved from the position shown in the other direction. Similarly the pawl 23 can be turned on in an anti-clockwise direction.

To co-act with the pawls 22, 23 there is provided a projecting peg 25 which is secured to a first sheet metal, annular member 26 which is disposed in the passage 12. The annular member 26 has two inwardly directed fingers 26a which engage in longitudinal slots in the steering shaft so as to cause the member 26 to rotate with the steering shaft. A hole 40 is formed in the member 26 adjacent at least one of the fingers 26a, this location being selected in that the additional width of the annular member 26 created by each of the inwardly directed fingers 26a ensures that the member 26 is not excessively weakened by a hole therein. The peg 25 extends through one of the holes as shown.

Secured to the member 26 is a second annular member 27 formed of a synthetic resin material. The member 27 is shaped at its outer periphery to form, in combination with the member 26, an external groove in which an integral annular rib in the passage 12 is held captive. The two annular members 26, 27 are assembled *in situ* in the passage 12. The assembly is rotatable relative to the body.

In use it will be appreciated that the peg 25 moves with the steering shaft relative to the body. When the member 17 is in its neutral position neither of the pawls 22, 23 is in the path of the peg. When the member 17 is manually displaced to one of its actuated positions, for example in a clockwise direction as viewed in FIG. 3, the pawl 23 is brought into the path of the peg 25. When the steering shaft is turned in a clockwise direction, the peg 25 strikes the pawl 23 and causes the pawl 23 to be turned in an anti-clockwise direction, however, the pawl can be displaced relative to the member 17 when it is struck by the peg 25 and the member 17 is moved in an anti-clockwise direction. The member 17 is returned to its neutral position by the action of the spring loaded plunger 19.

In a modification the peg 25 is welded to the member 26 rather than being carried in a hole in the member 26. Moreover, the steering shaft can include a clip defining said longitudinal slot or slots the clip being non-rotatably mounted on the shaft to ensure a driving connection between the member 26 and the shaft through the clip and the fingers 26a.

We claim:

1. A self-cancelling direction indicator switch for a road vehicle, comprising a body for attachment to a vehicle, an operating member movable with respect to the body for completing in use circuits to the indicator lamps, and cancelling means for returning the operating member to a neutral position, said cancelling means being carried by said body and including a first annular member having at least one inwardly directed finger for engagement in a slot in the steering shaft of the vehicle, a projection on said first annular member for effecting return of said operating member to its neutral position on turning of said steering shaft relative to said body and a second annular member secured to said first annular member, said first and second annular members defining an external groove by means of which said annular members are held captive on an inwardly projecting portion of said body.

2. A self-cancelling direction indicator switch as claimed in claim 1 wherein said projection is provided on said first annular member adjacent said inwardly directed finger.

* * * * *